US008117458B2

(12) United States Patent
Osborn, III et al.

(10) Patent No.: US 8,117,458 B2
(45) Date of Patent: Feb. 14, 2012

(54) METHODS AND SYSTEMS FOR GRAPHICAL IMAGE AUTHENTICATION

(75) Inventors: Steven L. Osborn, III, Sand Springs, OK (US); Nicholas A. Davis, Tulsa, OK (US); James L. Sontag, Claremore, OK (US); Joel Norvell, Tulsa, OK (US)

(73) Assignee: Vidoop LLC, Tulsa, OK (US)

( * ) Notice: Subject to any disclaimer, the term of this patent is extended or adjusted under 35 U.S.C. 154(b) by 1006 days.

(21) Appl. No.: 12/035,377

(22) Filed: Feb. 21, 2008

(65) Prior Publication Data

US 2008/0244700 A1    Oct. 2, 2008

Related U.S. Application Data

(63) Continuation-in-part of application No. 11/677,562, filed on Feb. 21, 2007, now abandoned, which is a continuation-in-part of application No. 11/420,061, filed on May 24, 2006, now abandoned.

(51) Int. Cl.
G06F 7/04 (2006.01)

(52) U.S. Cl. ...................................................... 713/183

(58) Field of Classification Search ...... 726/2; 713/183, 713/184
See application file for complete search history.

(56) References Cited

U.S. PATENT DOCUMENTS

| | | | |
|---|---|---|---|
| 5,276,314 | A | 1/1994 | Martino et al. |
| 5,428,349 | A | 6/1995 | Baker |
| 5,465,084 | A | 11/1995 | Cottrell |
| 5,559,961 | A | 9/1996 | Blonder |
| 5,608,387 | A | 3/1997 | Davies |
| 5,664,099 | A | 9/1997 | Ozzie et al. |
| 5,821,933 | A | 10/1998 | Keller et al. |
| 5,928,364 | A | 7/1999 | Yamamoto |
| 5,948,061 | A | 9/1999 | Merriman et al. |

(Continued)

FOREIGN PATENT DOCUMENTS

JP    11-345206    12/1999

(Continued)

OTHER PUBLICATIONS

Dhamija et al. Déjà Vu: a user study using images for authentication. Proceedings of the 9th USENIX Security Symposium. Denver, Colorado. Aug. 14-17, 2000. (15 pages).

*Primary Examiner* — Ellen Tran
(74) *Attorney, Agent, or Firm* — San Diego IP Law Group LLP

(57) ABSTRACT

Systems and methods for providing authentication using an arrangement of dynamic graphical images, which may display a popup element while a pointing device indicator is over a graphical image. The graphical images can be arranged as a grid or matrix for presentation on a device display for authentication of a user. The kinds of graphical images can be derived from a designated authentication category and non-authenticating categories. A series of password elements corresponding to the graphical images can be displayed with the graphical images. The user may enter the series of one or more password elements corresponding to graphical images from the authentication category which combine to form a password entry. An authentication server can compare the password entry to an authentication password corresponding to the particular arrangement of dynamic graphical images. The selection of graphical images, their arrangement and their corresponding password elements, may dynamically change in between authentication processes.

25 Claims, 11 Drawing Sheets

U.S. PATENT DOCUMENTS

| | | | |
|---|---|---|---|
| 6,102,406 | A | 8/2000 | Miles et al. |
| 6,209,104 | B1 | 3/2001 | Jalili |
| 6,351,634 | B1 | 2/2002 | Shin |
| 6,686,931 | B1 | 2/2004 | Bodnar |
| 6,718,471 | B1 | 4/2004 | Kashima |
| 6,720,860 | B1 | 4/2004 | Narayanaswami |
| 6,792,466 | B1 | 9/2004 | Saulpaugh et al. |
| 6,823,075 | B2 | 11/2004 | Perry |
| 6,862,594 | B1 | 3/2005 | Saulpaugh et al. |
| 6,895,387 | B1 | 5/2005 | Roberts et al. |
| 6,950,949 | B1 | 9/2005 | Gilchrist |
| 6,980,081 | B2 | 12/2005 | Anderson |
| 6,981,016 | B1 | 12/2005 | Ryan |
| 7,021,534 | B1 | 4/2006 | Kiliccote |
| 7,028,192 | B2 | 4/2006 | Butler |
| 7,093,282 | B2 | 8/2006 | Hillhouse |
| 7,130,831 | B2 | 10/2006 | Howard et al. |
| 7,219,368 | B2 | 5/2007 | Juels et al. |
| 7,225,157 | B2 | 5/2007 | Howard et al. |
| 7,240,367 | B2 | 7/2007 | Park |
| 7,451,323 | B2 | 11/2008 | Abe et al. |
| 7,536,556 | B2 | 5/2009 | Fedorova et al. |
| 7,552,330 | B2 | 6/2009 | Kokumai |
| 7,574,739 | B2 | 8/2009 | Shirakawa |
| 7,577,994 | B1 | 8/2009 | Sobel et al. |
| 7,680,815 | B2 | 3/2010 | Komine et al. |
| 7,884,825 | B2 | 2/2011 | Nakahashi et al. |
| 2001/0007097 | A1 | 7/2001 | Kim |
| 2001/0013039 | A1* | 8/2001 | Choi ................ 707/104.1 |
| 2001/0037314 | A1 | 11/2001 | Ishikawa |
| 2001/0037468 | A1 | 11/2001 | Gaddis |
| 2002/0019768 | A1 | 2/2002 | Fredrickson et al. |
| 2002/0083347 | A1 | 6/2002 | Taguchi |
| 2002/0094868 | A1 | 7/2002 | Tuck et al. |
| 2002/0188872 | A1 | 12/2002 | Willeby |
| 2003/0046551 | A1 | 3/2003 | Brennan |
| 2003/0084275 | A1 | 5/2003 | David et al. |
| 2003/0093699 | A1 | 5/2003 | Banning et al. |
| 2003/0177248 | A1 | 9/2003 | Brown et al. |
| 2003/0191947 | A1 | 10/2003 | Stubblefield et al. |
| 2003/0210127 | A1* | 11/2003 | Anderson ................ 340/5.27 |
| 2003/0215110 | A1 | 11/2003 | Rhoads et al. |
| 2004/0010721 | A1 | 1/2004 | Kirovski et al. |
| 2004/0030934 | A1 | 2/2004 | Mizoguchi et al. |
| 2004/0172564 | A1 | 9/2004 | Federova et al. |
| 2004/0230843 | A1 | 11/2004 | Jansen |
| 2004/0250138 | A1 | 12/2004 | Schneider |
| 2004/0260955 | A1 | 12/2004 | Mantyla |
| 2005/0010758 | A1 | 1/2005 | Landrock et al. |
| 2005/0010768 | A1* | 1/2005 | Light et al. ................ 713/168 |
| 2005/0071637 | A1 | 3/2005 | Shirakawa |
| 2005/0071686 | A1 | 3/2005 | Bagga et al. |
| 2005/0076357 | A1 | 4/2005 | Fenne |
| 2005/0169496 | A1 | 8/2005 | Perry |
| 2005/0268100 | A1 | 12/2005 | Gasparini et al. |
| 2005/0268101 | A1 | 12/2005 | Gasparini et al. |
| 2005/0268107 | A1 | 12/2005 | Harris et al. |
| 2005/0276442 | A1 | 12/2005 | Alasia et al. |
| 2005/0283443 | A1 | 12/2005 | Hardt |
| 2005/0283614 | A1 | 12/2005 | Hardt |
| 2006/0020812 | A1 | 1/2006 | Steinberg et al. |
| 2006/0020815 | A1 | 1/2006 | Varghese et al. |
| 2006/0053293 | A1 | 3/2006 | Zager et al. |
| 2006/0075027 | A1 | 4/2006 | Zager et al. |
| 2006/0075028 | A1 | 4/2006 | Zager et al. |
| 2006/0085360 | A1 | 4/2006 | Grim, III et al. |
| 2006/0105739 | A1* | 5/2006 | Frank et al. ................ 455/408 |
| 2006/0174339 | A1 | 8/2006 | Tao |
| 2006/0183551 | A1 | 8/2006 | Prudent |
| 2006/0206717 | A1 | 9/2006 | Holt et al. |
| 2006/0206918 | A1 | 9/2006 | McLean |
| 2006/0206919 | A1 | 9/2006 | Montgomery et al. |
| 2006/0230435 | A1 | 10/2006 | Kokumai |
| 2006/0248344 | A1 | 11/2006 | Yang |
| 2007/0023506 | A1 | 2/2007 | Lagadec et al. |
| 2007/0033102 | A1 | 2/2007 | Frank et al. |
| 2007/0041621 | A1 | 2/2007 | Lin et al. |
| 2007/0074119 | A1 | 3/2007 | Komine et al. |
| 2007/0130618 | A1 | 6/2007 | Chen |
| 2007/0198846 | A1 | 8/2007 | Watari |
| 2007/0250920 | A1 | 10/2007 | Lindsay |
| 2007/0277224 | A1 | 11/2007 | Osborn et al. |
| 2008/0052245 | A1 | 2/2008 | Love |
| 2008/0141351 | A1 | 6/2008 | Park |
| 2008/0222710 | A1 | 9/2008 | Blagsvedt et al. |
| 2008/0235788 | A1 | 9/2008 | El Saddik et al. |
| 2008/0307310 | A1 | 12/2008 | Segal et al. |
| 2008/0320310 | A1 | 12/2008 | Florencio et al. |
| 2009/0037339 | A1 | 2/2009 | Ancell et al. |
| 2009/0038006 | A1 | 2/2009 | Traenkenschuh et al. |

FOREIGN PATENT DOCUMENTS

| | | |
|---|---|---|
| JP | 2001092785 A | 4/2001 |
| KR | 2002-0026636 | 4/2002 |
| KR | 2004-0032869 | 4/2004 |
| KR | 2004-0047155 | 6/2004 |
| KR | 2004-0067123 | 7/2004 |
| KR | 2006-0127850 | 12/2006 |
| NZ | 541711 A | 7/2005 |
| WO | WO 02/054199 | 7/2002 |
| WO | WO 2006/064241 A2 | 6/2006 |
| WO | WO 2006/064241 A3 | 8/2006 |

* cited by examiner

Username : ☐
Password : ☐

Fig. 4

METHODS AND SYSTEMS FOR GRAPHICAL IMAGE AUTHENTICATION

CROSS-REFERENCE TO RELATED APPLICATION

This is application is a continuation-in-part of U.S. patent application Ser. No. 11/677,562, filed on Feb. 21, 2007 now abandoned, which is a continuation-in-part of U.S. patent application Ser. No. 11/420,061, filed on May 24, 2006 now abandoned, which are incorporated herein reference in their entirety.

BACKGROUND OF THE INVENTION

1. Field of the Invention

The present invention is directed to a method and system of authenticating identity to a computer system. In particular, the present invention is directed to a graphical image identity authentication system.

2. Background

Computer networks, particularly those with global reach such as the Internet, have greatly influenced the way that individuals, companies and institutions conduct transactions, and store and retrieve documents, images, music, and video. Convenience, ease of use, speed, and low overhead costs are contributing factors to the widespread use of the Internet for purchasing goods as well as conducting confidential transactions. Entire industries have emerged as a result of the evolution of the Internet.

Secure access to computer systems and computer networks has been traditionally guarded with a username and password pair. This requires the user to protect the username and password from unauthorized use. If the username and password are not protected, accounts and files can be compromised. Unfortunately, a number of rogue individuals and organizations have emerged that are dedicated to fraudulently obtaining confidential information for unauthorized or criminal activities.

A pervasive tool used in obtaining confidential information is keystroke-logging software, which constitutes a program that monitors and records what users type on their computers. Such software often comprises the payload of viruses, worms, Trojan horses, and other forms of malware. Keystroke-logging software can reveal what a user is typing on a computer without the user's knowledge of this event occurring.

Companies and institutions routinely use keystroke-logging software to monitor employee activity. Also, families may use these types of programs to monitor children's online activities. The widespread availability of this type of software, however, has led to unauthorized or criminal use, resulting in the alarming rate of identity theft seen throughout the world.

Prime targets for these attacks are financial institutions, as more and more consumers and businesses use electronic methods for purchasing and making payments. According to the American Banker's Association, cash and checks now account for only 45 percent of consumer's monthly payments, down from 57 percent in 2001, and 49 percent in 2003. The trend is clearly in favor of electronic transactions, providing a wider field for identity theft.

Login information may also be "heard" by sophisticated analysis of the distinct sounds made by different keys. An inexpensive microphone near a keyboard can reveal most of what is being typed with a surprising degree of accuracy (http://www.schneier.com/blog/archives/2005/09/snoopin-g_on_tex.html). The present invention thwarts attempts to record the successful completion to the login process, as the keystrokes typed cannot be linked to the user's true authentication parameters.

Login information is also vulnerable to simple spying or "shoulder-surfing," as a person with malicious intent watches an unsuspecting user sign into his or her account. The present invention employs a method that significantly reduces the likelihood of a successful shoulder-surfing style of attack.

Additional security mechanisms are necessary in addition to the username/password paradigm to provide stronger identity authentication. There have been various other attempts to do so.

Enterprises and institutions are using costly physical devices to identify legitimate customers and users. The existing devices generate a unique pass code for each user every 30 to 60 seconds. If an attacker manages to intercept a user ID and password, the information cannot be used to access the site without an additional authentication identifier displayed by the device. The devices significantly reduce instances of identity or information theft, but present challenges for both the institutions and individual users.

The enterprise may meet with consumer resistance in implementing use of the physical device. If the user does not have the device, he or she cannot gain access to the site. Besides the tremendous initial cost of purchasing the physical devices and implementing the new system, if the device is lost, stolen, or damaged, the enterprise will incur even more significant costs. In the context of business use of the device, the company incurs the cost of lost productivity from a worker who cannot access company information, as well as the cost of replacing the actual device. In the context of consumer use, if the consumer cannot access his or her accounts because of a lost device, the direct costs, and more significantly the indirect costs incurred by the enterprise to assist the consumer in gaining access far outweighs the advantages of using the device system.

In U.S. Pat. No. 5,559,961, Blonder provides a solution for utilizing graphical passwords. The framework described displays a static image in which the user touches predetermined areas of the screen, called "tap regions," in a particular sequence. As the user taps various areas on the display, the regions tapped are successively removed from the screen. These regions of the screen, and the order of the sequence they are tapped, are chosen by the user during an initial enrollment phase. The sequence and regions of taps is stored in the system as the user's password. One shortcoming of this solution is the likelihood of a shoulder-surfing attack: once an attacker views a user entering the sequence by touching areas of the screen, he or she is then easily able to replicate the sequence to successfully gain access to the user's account.

U.S. Patent Application Publication No. 2003/0191947 to Stubblefield uses inkblots as images for authentication of a user's identity when logging into computer systems. The authentication method described in this patent provides for a display of a random sequence of inkblots that the user has identified when he or she enrolled his or her login information. One drawback to this process stems from the identification of the inkblot. Although the user is required to identify and verify the alphanumeric text associated with the inkblots in the enrollment process, the ineffable nature of inkblots will cause consumers problems in remembering the code for their inkblot selections. A frustrated user will simply save their password information on their computer, write the information down, or enter incorrect password information, which defeats the security offered by this system. Also, this process is very intimidating for users, especially those who are neophyte users, because the inkblot is easily misconstrued as a myriad of different objects. The inkblot is just that: a blot on a screen the user will associate with a real world object. If that user misinterprets or forgets the association they have made with the inkblot they are denied access to their system. More importantly, the sequence process significantly increases login time for users. Currently, users are demanding more secure login techniques, but they desire to maintain the same level of convenience that they currently enjoy with the username/password login process. This authentication technique does not provide the ease of use that consumers desire.

U.S. Patent Application Publication No. 2004/0230843 to Jansen, which is a login authentication process using a sequence of images selected by the user, illustrates the potential of image-based authentication in protecting users from identity theft. The authentication method described in this patent application begins with the user selecting an image theme, such as animals, and then selecting a sequence of images within the image theme that becomes the password (e.g. if the category chosen is animals, one possible sequence is horse, cat, dog, cat, cat, horse). The success of the login process is predicated on the user's ability to replicate the sequence of images he or she has chosen within the image theme. In other words, the user must memorize the proper sequence. One drawback appears to be the complex nature of the sequence process. As defined in the patent application, if a user feels that he or she will be unable to remember the password, the user will simply write down the password so that recall becomes unnecessary. Also, because the images are typically static (the user can elect to "shuffle" images between login attempts, but most will likely stay with the simple default configuration), software can be created to automate the process. In this scenario the authentication requires no human interaction to complete the login, which tremendously decreases the level of security provided. Although the positions of the images can be shuffled within the grid, the fact that they are static means that shuffling only prevents attackers from guessing the likely placement of the sequence, not the images themselves. Moreover, the traditional text password is completely removed from the login process, meaning that the security offered in this solution is only single layer, whereas authentication processes that complement the existing login process provide multiple levels of security.

U.S. Patent Application Publication No. 2005/0268100 and Publication No. 2005/0268101 to Gasparini et al. discloses two way authentication including images which serve as customization information so that an entity can authenticate itself to a user, but is otherwise dissimilar.

Because of these noted shortcomings, an improved system and method is needed to create password values that are both exceedingly difficult for an intruder to compromise, while simultaneously easy for a user to apply and maintain.

SUMMARY OF THE INVENTION

The present invention provides a system and method for the secure identity authentication to a computer system. It is a further object and purpose of the present invention to provide an authentication and security system, which requires graphical discernment of one or more image categories from a grid of distinct visual images. Various aspects of the invention described herein may be applied to any of the particular applications set forth below. The invention may be applied as a standalone authentication system or also as a revenue generating advertising component to an integrated authentication solution. The invention can be optionally integrated into existing business and authentication processes seamlessly. It shall be understood that different aspects of the invention can be appreciated individually, collectively or in combination with each other.

An aspect of the present invention provides an enrollment mechanism and process for new or first-time users. During an enrollment stage, a user will be required to select a series of one or more image categories, which will serve as the user's authentication sequence.

Another aspect of the invention provides systems and methods for providing graphical image authentication of a user. An embodiment provided in accordance with this aspect of the present invention requires the user to input a username at the point of user login. After validating the username, a grid of images corresponding to the pre-defined categories will be displayed. One image from each category will appear at a random location within the grid. If the number of available categories exceeds the number of image positions in the grid, the displayed categories may be selected from the pool of available categories.

A preferable embodiment of the present invention overlays each image with a randomly generated sequence of one or more characters. This sequence is known as an "image key" or "image identifier." Within the image grid, the user will identify the images corresponding to the pre-selected authentication sequence, and input each associated image identifier in the provided input field. In accordance with these and other embodiments of the present invention described elsewhere herein, the identity of a user can be authenticated by matching the image identifier(s) input by the user with the correct image identifiers(s) derived from the pre-chosen authentication sequence.

Another aspect of the present invention provides authentication systems that are essentially immune from attacks using keystroke loggers. Preferable embodiments of the invention include a corresponding image identifier for each image that is a randomly generated sequence of one or more characters. There may be a predetermined mapping between the image identifier and the image category established by the authentication mechanism ahead of time. Meanwhile, during an authentication process, a user may ascertain that mapping by graphical discernment of the images. The authentication sequence can be input by the user using or entering the series of one or more randomly generated image identifiers. Without the images displayed, the text entered by the user will be effectively random characters and will not provide clues to the authentication sequence of the user. Attackers will not be able to ascertain the image category authentication sequence of a user by capturing keystrokes. Preferable embodiments of the invention display different images with different randomly generated image identifiers during a subsequent authentication process such that a previously observed set of keystrokes or password will not be accepted. It shall be understood that as with other embodiments of the invention herein, the combination of one or more image identifiers derived from a given set of displayed images may preferably give rise to a new password at each login or step in a process calling for authentication.

With respect to yet another aspect of the invention that provides methods and systems for authentication, the risk of attacks involving shoulder surfing is also mitigated. For example, traditional username/password authentication systems could be compromised if attackers visually discern the keystrokes entered by the user during the login process. The present invention requires the attacker to visually discern both the keystroke entered by the user in the form of image identifier as well as the graphical discernment of the images for the mapping between image identifier and the image category. The authentication sequence of the user is compromised only if both forms of information are captured. Accordingly, this aspect of the invention increases the difficulty in successfully executing such kinds of attacks committed while users are entering password information.

In terms of brute force attacks, the search space for a preferable embodiment of the present invention that renders a grid of generated images during an authentication process is equal to:

$$(g)^n$$

where g is the number of elements in the image grid and n is the length of the authentication sequence to be entered by a user. For example, a reasonable implementation of the invention may call for a grid size of 16, and an authentication sequence length of 3. This would result in a brute force search space of:

$$16^3 = 4096$$

On average, the brute force attack would succeed after 2048 tries. While this seems like a low number in the context of security algorithms, risk is mitigated by the nature of the algorithm as well as by additional safeguards. The mapping between the image identifier and the image category in preferable embodiments of the invention requires graphical discernment of images. Image identifiers could be obfuscated on the image using captcha techniques, making them discernable only by humans. This means the brute force attack must be perpetrated by a human and cannot be automated. An automated agent could only randomly guess the image identifier. Accordingly, the search space for the instance of this brute force attack is:

$$(r^l)^n$$

where l is the length of the image identifier, r is the range of the image identifier (26 if it is case insensitive alphabetical, 96 if it is displayable characters), and n is the length of the authentication sequence. A reasonable policy could call for an alphabetical image identifier of length 2. In this case, the brute force search space is:

$$(26^2)^3 = 308,915,776$$

If the captcha obfuscation could be defeated, it is still effectively impossible with the current state of the art for automated processes to recognize the image category from a random image (i.e. recognize a random image of a Ford Mustang® as an automobile). Therefore, automated agents would not be able to perform a systematic brute force attack. They would have to enter random image identifier at each try. This attack would succeed on average after 4096 tries.

In accordance with another embodiment of the invention, the threat from brute force attacks could be further mitigated by implementing a timed lockout policy after unsuccessful logins. A reasonable policy would be to temporarily disable the account for 10 minutes after three unsuccessful logins in a row. On average, the time it would take to succeed with a brute force attack would be:

$$(10 \text{ minutes})*(4096-3) = 40930 \text{ minutes} = 28 \text{ days}$$

Furthermore, the size of the image grid, the length of the authentication sequence, and the lock out time could be increased to exponentially increase the brute force search time.

More preferable embodiments of the present invention can be implemented in conjunction with a traditional identity authentication paradigm such as username/password as an extra layer of security, thereby increasing the security provided by the overall system.

Another aspect of the invention provides systems and methods for sponsored authentication. In addition to providing authentication solutions to guard against fraud and other types of illegal activity, the invention may also facilitate advertisement campaigns by displaying images, descriptions, and/or references supplied by or chosen by advertisers. Preferable embodiments of the invention provide a series of one or more graphical images displayed in a predetermined grid or other arrangement for viewing by the user. Because the user is conducting an authentication process, it is highly likely that the user is giving his/her full or undivided attention to the graphical image and its corresponding image identifier. This level of attention and ability to target advertising based on a preselected category of images by a user creates a powerful marketing and advertisement opportunity. Preferable embodiments of the invention may be extended by replacing or augmenting the images in the image grid with audio, video, or other forms of media or multimedia. Another embodiment of the invention may include adding a popup element that may contain an advertisement and that may appear while a pointing device indicator, such as a mouse pointer, is over an image. This aspect of the present invention provides a number of other preferable embodiments or models as set forth in further detail herein.

Other embodiments of the invention provide systems and methods that allow secured data and/or password entry to computer-based systems, such as for example, networked computer systems, automated teller machines ("ATMs"), mobile telephones and devices, personal digital assistants (PDAs including Blackberry or similar devices with e-mail and Internet access capabilities), and online retail web sites and banking services. Many of the computer-based systems used today which rely on single factor authentication such as entering a password or access code which can be modified in accordance with the invention in order to provide stronger authentication before allowing access to secured information and resources. For example, in an office computer environment with access to a computer network such as a wide area network ("WAN") or a local area network ("LAN"), access by individual users to the computer network can be controlled by dynamic graphical password systems provided herein. Access can be provided at a local node or other such client computer within the network such as user personal computers ("PCs"). Such systems with display capabilities may identify the user to the network by accepting a user name or initials (which may be referred to as the "User ID"), and then authenticate the user upon entry of one or more appropriate password elements derived from an dynamic arrangement of graphical images such as a visual grid.

For online applications, a user may seek to obtain access to a secure networked resource, such as a World Wide Web ("Web") site on the Internet or other online service. This may include access to online banking services or other information subject to restricted access. Furthermore, the user may want to shop for and purchase a product or service available via a retail Web site. The user may be authenticated in accordance with the concepts of the dynamic graphical image arrangements described elsewhere herein before gaining access to a secured resource or conducting an online purchase requiring entry of credit card number or similar information to make a transaction.

In an ATM system, a user typically will be provided with a card having a readable magnetic strip which identifies the user to the ATM network. Instead or relying upon a conventional static personal identification number, or PIN, which must be entered by the user, an arrangement or grid of dynamic graphical icons can be presented such that corresponding password elements corresponding to icons falling within an authenticating category can be entered by the user. As described in the various authentication methods and systems provided herein, the password element(s) can be different between logons or transactions. The password element(s) may be entered through an alphanumeric keypad ordinarily used for PIN entries. After the one or more password elements are verified, the user can then be granted access to bank accounts in order to conduct transactions such as withdrawal of cash and a wide range of other banking activity, including online banking transactions. For example, digital representations or images of financial documents or instruments such as checks can be displayed to a user following authentication. A cashed check can be displayed to the user after processing by known check imaging systems (e.g., Merchant Capture) that may transform paper checks into images. Additionally, other forms of electronic or Automated Clearing House (ACH) payments can be authorized by the user following authentication. It shall be understood that financial transactions and other forms of secured network activity including e-commerce applications can be made more secure in accordance with the invention.

Secured systems such as the ones described above and others can be guarded against fraud and theft by implementing dynamic graphical password systems provided herein. Because password elements within a graphical image arrangement preferably change in between sessions or transactions, there is no imminent breach of or loss of security even if a perpetrator observes entry of the actual password sequence. Someone observing entry of the password elements by the user cannot readily determine the relevant authenticating category or logic behind the password based on observation of the key entries alone since the locations and selection of the graphical images or icons are preferably randomized. Moreover, the selection of displayed graphical images, their positioning within an arrangement or grid, and their corresponding password elements, are preferably varied between authentication processes. The user does not have to memorize exact password characters but can rather look for graphical images falling within a selected authenticating category and enter in corresponding password elements as to those images only. Accordingly, various types of the over-the-shoulder attacks can be defended against by applying these and other concepts of the invention.

Other goals and advantages of the invention will be further appreciated and understood when considered in conjunction with the following description and accompanying drawings. While the following description may contain specific details describing particular embodiments of the invention, this should not be construed as limitations to the scope of the invention but rather as an exemplification of preferable embodiments. For each aspect of the invention, many variations are possible as suggested herein that are known to those of ordinary skill in the art. A variety of changes and modifications can be made within the scope of the invention without departing from the spirit thereof.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

FIGS. 4 and 5 illustrate examples of screen displays that would be incorporated as a part of the present invention as shown in FIG. 2 or 3.

DETAILED DESCRIPTION OF THE INVENTION

The embodiments discussed herein are merely illustrative of specific manners in which to make and use the invention and are not to be interpreted as limiting the scope of the instant invention.

While the invention has been described with a certain degree of particularity, it is to be noted that many modifications may be made in the details of the invention's construction and the arrangement of its components without departing from the spirit and scope of this disclosure. It is understood that the invention is not limited to the embodiments set forth herein for purposes of exemplification.

The present invention provides a method and system for user identity authentication to a computer system which requires users to select an authentication sequence based on categories during enrollment and recreating the authentication sequence during login by graphically discerning images belonging to the previously selected categories.

Figure 1:
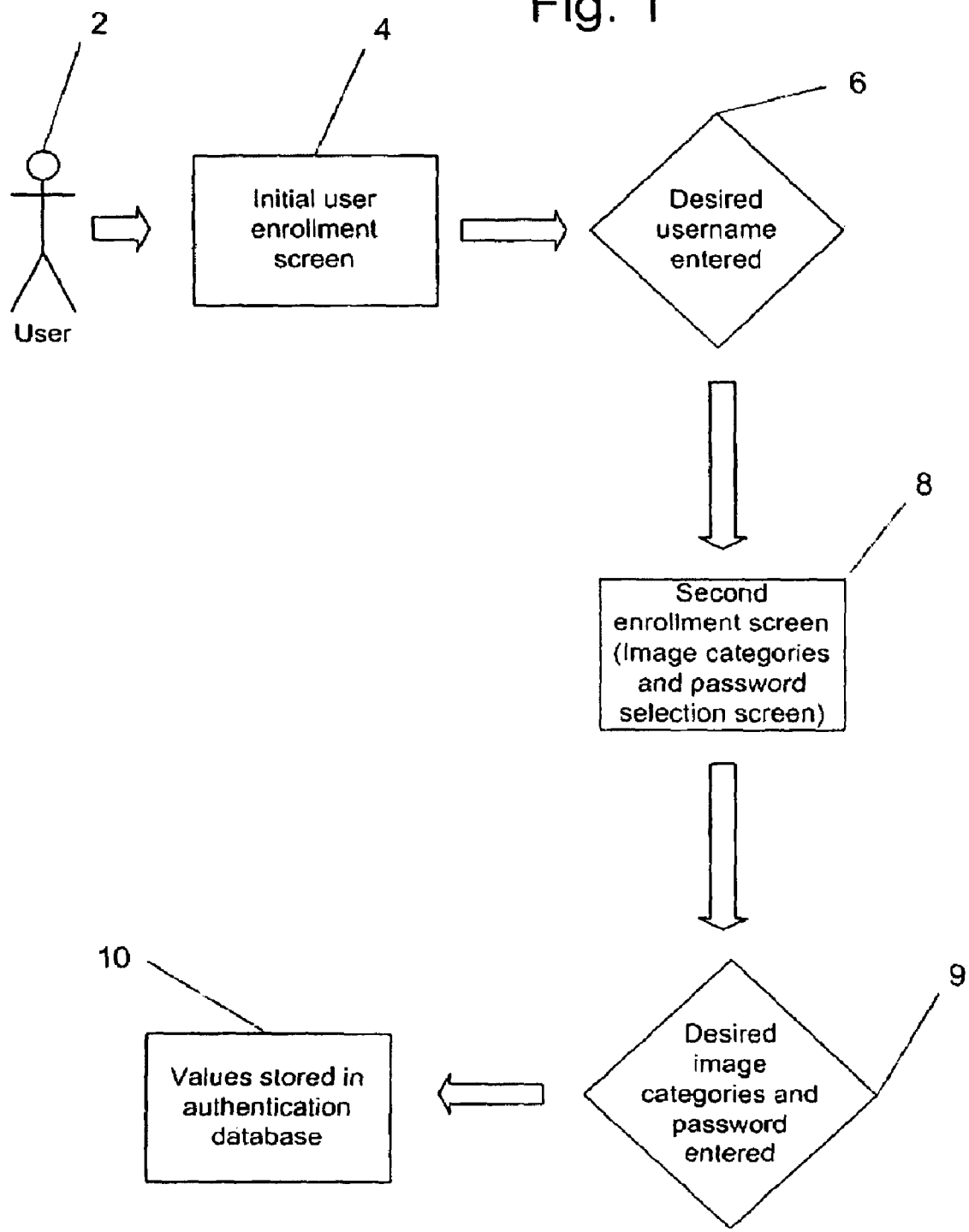
FIG. 1 illustrates a simplified flowchart diagram of an enrollment process used in connection with the present invention directed to a graphical image authentication and security system.

Referring to the drawings in detail, FIG. 1 illustrates a simplified flow chart diagram of an initial enrollment process in order to enroll a user to utilize the present invention. During enrollment, the user shown as 2 will be presented with an initial enrollment screen in box 4 where the desired username is entered in diamond 6. After the username is granted, a second enrollment screen in box 8 is presented to select the traditional password and the image category authentication sequence for the system. The authentication information is entered in diamond 9 and stored into the authentication database in box 10.

Figure 2:
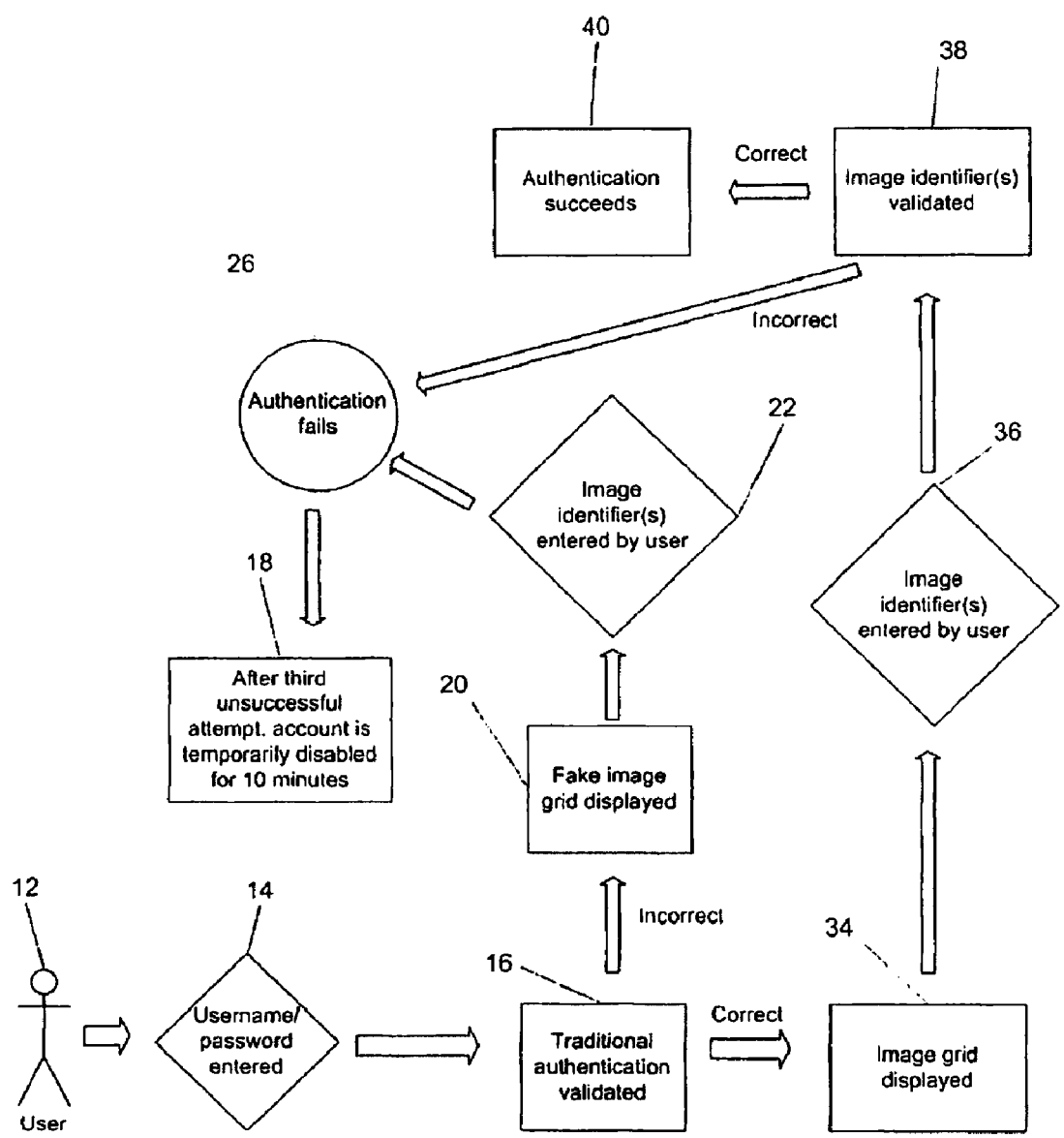
FIG. 2 illustrates a simplified flowchart diagram of a preferred embodiment in accordance with the present invention directed to a graphical image authentication and security system.

Referring to the drawings in detail, FIG. 2 illustrates a simplified flowchart diagram of a preferred embodiment of the present invention. In this embodiment, a graphical image authentication and security system is used in conjunction with a traditional username/password authentication paradigm to increase the overall level of security in a system. The overall process includes a number of discreet steps to authenticate identity to a computer system. By way of example, but not limitation, the computer device operated by the user may include a personal computer (PC) having a central processing unit (CPU), a keyboard or other input device and monitor; a personal digital assistant (PDA); a user terminal at a bank automated teller machine (ATM); a cellular mobile telephone; or other device.

Figure 4:
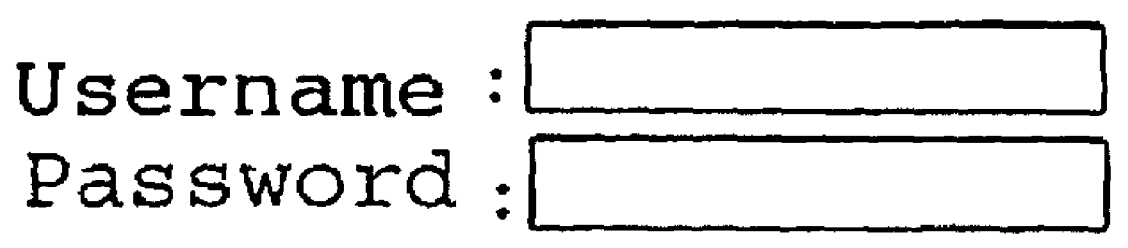

The user 12 will enter a first login account identifier, such as his or her username, and a traditional password, represented by diamond 14 in an input device such as a keyboard. By way of example, the username may be a series of alphanumeric characters, as is well known. By way of example, the password may be a series of alphanumeric and special characters, as is well known. (FIG. 4 shows an example of the traditional username/password login screen.)

The username/password is validated in box 16. If the authentication fails because of the username/password entered, a fake grid of images that appears normal is displayed as shown at box 20, the user will be able to enter an image identifier normally at diamond 22 however any authentication attempt fails as shown at reference numeral 26. If the username/password pair is authenticated, an image grid will be generated and displayed at box 34. The cells of the grid will display images from different categories (such as those in FIG. 5). The location of the categories in the grid is randomized. The specific image for each category is chosen randomly from a database of images for that specific category. Each image will be overlaid with a unique randomly generated image key. Captcha techniques could be employed to obfuscate image keys so they are not machine-readable. This would require human perception and cognition to mediate the login which could prevent automated brute force attacks on the authentication process.

The user will select the image on the grid according to the categories in their authentication sequence by entering the image key overlaid on the images, box 36. The sequence of image keys is sent to the authentication server for validation, box 38. If the image keys are validated, the authentication concludes successfully, box 40. If the image keys are not validated, authentication fails and the login process must be reinitiated. A timed lockout of 10 minutes as shown by 18 is applied after three unsuccessful logins to mediate the threat from brute force attacks that attempt to guess an authentication sequence.

Figure 3:
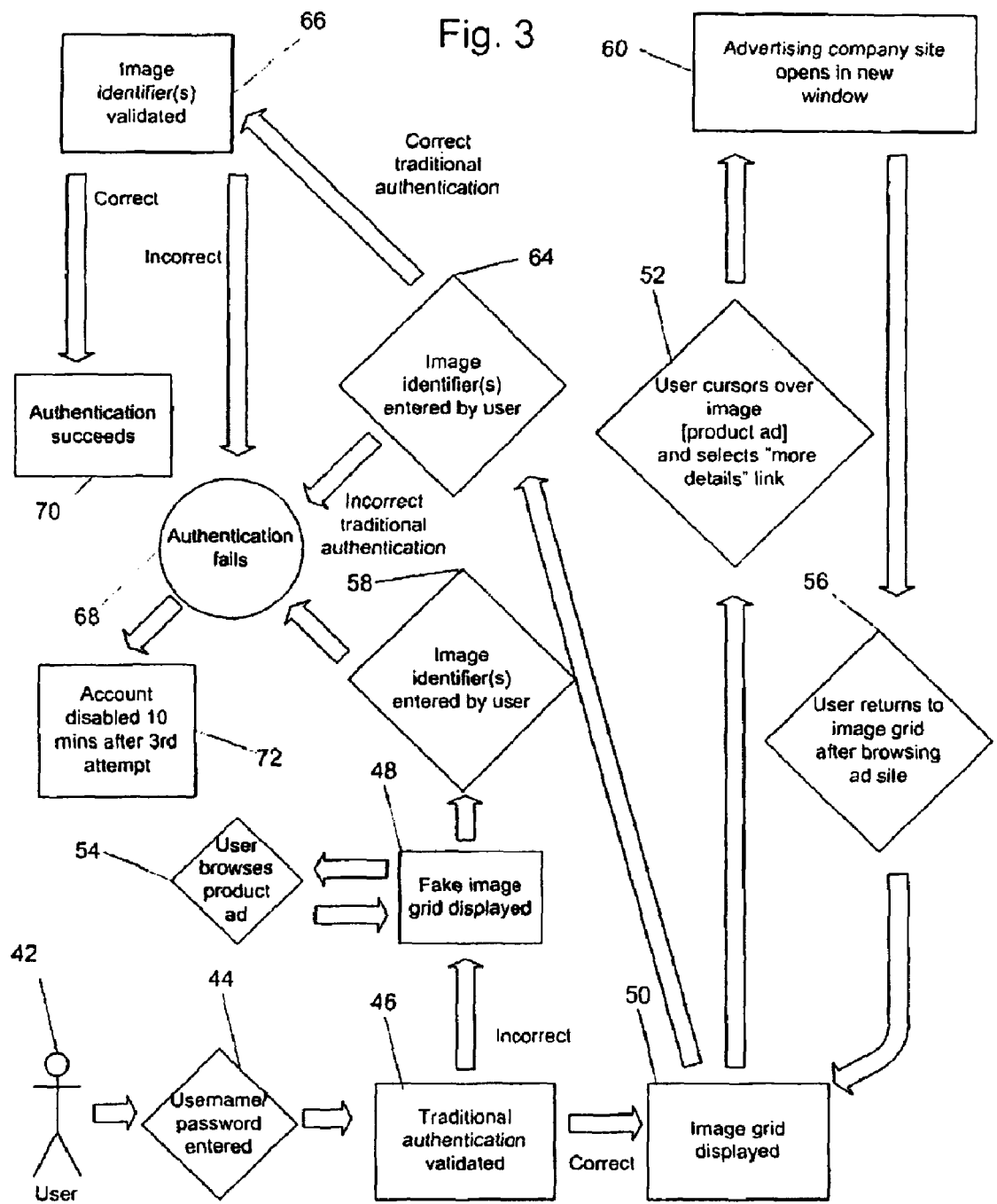
FIG. 3 illustrates a simplified flowchart diagram of an alternate embodiment of the present invention.

FIG. 3 illustrates an alternate embodiment of the present invention that extends the preferred embodiment from FIG. 2 to incorporate advertisements. The enrollment process for this embodiment will be identical to that of the previously described embodiment illustrated in FIG. 1, and the login process is also similar to that illustrated in FIG. 2. The user 42 will enter a first login account identifier, such as his or her username, and a traditional password, represented by diamond 44 in an input device such as a keyboard. By way of example, the username may be a series of alphanumeric characters, as is well known. By way of example, the password may be a series of alphanumeric and special characters, as is well known. The username/password is validated in box 46. If the authentication fails because of the username/password entered, a fake grid of images that appears normal is displayed as shown at box 48. While the user will be able to enter image identifiers in a seemingly normal manner at diamond 58, any authentication attempt fails as shown at reference numeral 68. If the username/password pair is authenticated, an image grid will be generated and displayed at box 50.

FIG. 4 shows an example of a traditional username/password login screen that may be displayed to a user for entry of authentication information in any of the embodiments of the invention described herein.

Figure 5:
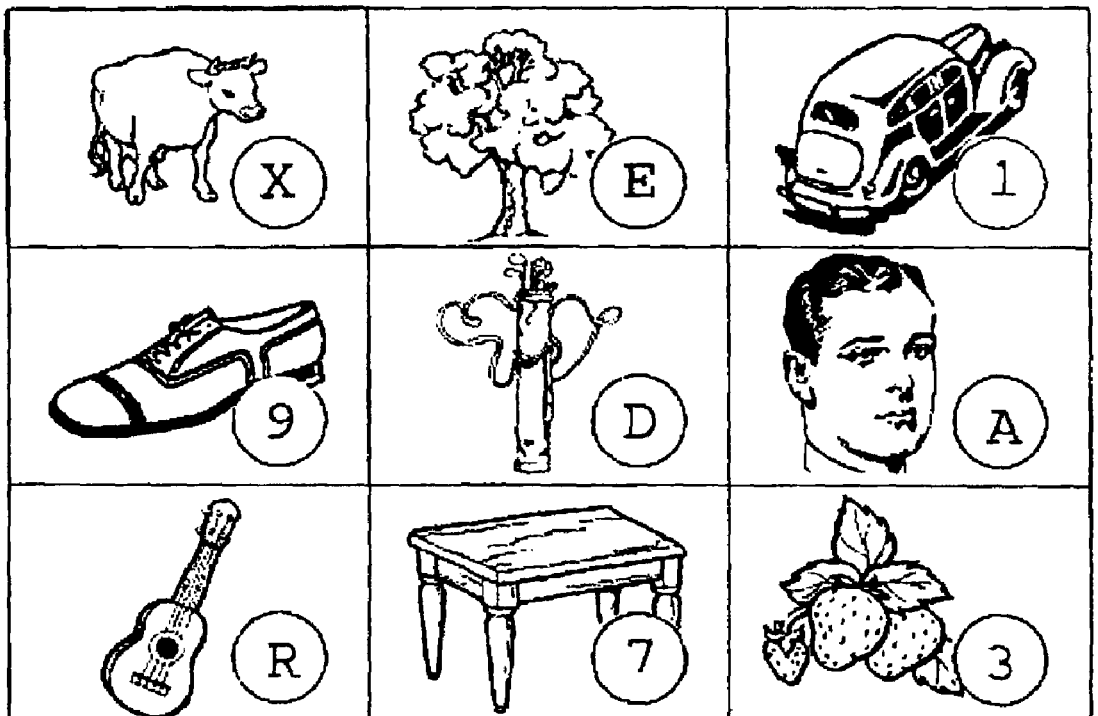

As shown on FIG. 5, the cells of an image grid will display a variety of images from different categories. The location of the categories in the grid is randomized. The specific image for each category is chosen from a database of images for that specific category. Each image will be overlaid with a unique randomly generated image key. Captcha techniques could be employed to obfuscate the image key so that it is not machine-readable. This would require a human to mediate the login and prevent automated brute force attacks on the authentication process.

An ancillary benefit of the present invention stems from the requirement of the user to view each of the visual images to determine which image is in the user's category. Advertising opportunities are presented for advertisers to display products in an array of images. The user cannot ignore the advertising, since the user must view and discern each of the images presented during authentication in order to choose the appropriate user selected image category.

The images in the database for this embodiment will contain advertisement images provided by advertisers. The image selected to be displayed on the grid will be based on the websites, the advertisement campaigns, and other parameters. The image grid displayed in box 48 and 50 will behave identically. The diamond in 54 is abbreviated and embodies 52, 60, and 56. When the user places the cursor over the image as in 52, additional information and links about the advertisement will be provided (which could otherwise be displayed automatically without cursor movement by the user). If the user chooses to follow an advertisement link, the destination of the link will open in a new window as shown in 60. When the user finishes browsing the advertisement website, the user will return to the log in screen through diamond 58. The user would not need to reenter the username and password after viewing an advertisement link, or in an alternative embodiment, the user would have to reenter authentication information after viewing an advertisement link, preferably when a predetermined amount of time has passed for security purposes. When the user finishes viewing the advertisement link, the image grid is refreshed and displayed again in 48 and 50 respectively.

In the case where the username/password is validated at 50, the user will select the image on the grid according to the categories in their authentication sequence by entering the image key overlaid on the images, box 64. The sequence of image keys is sent to the authentication server for validation, box 66. If the image keys are validated, the authentication concludes successfully, box 70. If the image keys are not validated, authentication fails at 68 and the login process is reinitiated. A timed lockout of 10 minutes is applied after three unsuccessful logins to mediate the threat from brute force guessing of the authentication sequence, box 72.

As shown in FIG. 5, a preferable embodiment of the invention provides an authentication system that generates an arrangement of dynamic images. Unlike a conventional static username and password model developed decades ago, the arrangement of dynamic images may preferably provide a user with a one-time or persistent access code that can be entered at the last minute, and just in time for login. The images in the arrangement, which may be arranged in what may be characterized as a dynamic image grid pattern, can be different and/or arranged differently each time a user logs in or performs some other action requiring an authentication process. However, the user knows which image(s) to look for and select within the arrangement because the images are based upon a preselected category designated by the user or third party during an enrollment process as described elsewhere herein. While a series of one or more graphical images within an arrangement can be dynamically altered in between logins or authentication processes, the preselected category can remain the same from the perspective of the user so long as desired or permitted according to established guidelines. So even if stronger authentication is provided in accordance with this embodiment of the invention, which eliminates any reliance on static hard-to-remember passwords or challenge questions, it may be preferred for certain applications to require a user nonetheless to renew or pick another category of images as the basis for a password or access code when desired (change password option) or after a specified length of time (automatic expiration of passwords that provide a number of opportunities to voluntarily change the category before it is mandatory pursuant to an established protocol).

For example, in a preferable embodiment of the invention, the categories of images displayed within a dynamic image arrangement may include the following: horses, flowers, mountains, money, objects in space, boats, airplanes, golf and cars. The image of an object falling within each of these categories can be shown in a predetermined arrangement such as a 3×3 grid or a tic-tac-toe grid for preferable embodiments of the invention. When the user registered his username during enrollment, a category was chosen or designated by the entity requesting authentication such as a financial institution.

The basis for a user selection could be some thing(s) that could be easily remembered by that person or something of interest such as cars, for example. During a login process, the user can look for and find any image(s) displayed within the arrangement falling within the selected category of cars. In spotting an appropriate image within this, the user is able to view an access code corresponding to the image representing the category. That access code becomes the password or portion of a password to the user for logging onto the system or during that particular authentication process. Meanwhile, during a subsequent process or next login, a variety of images falling within the selected category and non-selected categories will be arranged, preferably in a random manner. The images representing these categories can be randomly chosen among dozens, hundreds or more images in each category. Because the images appear and move randomly throughout the dynamic image arrangement between logins or between authentication processes, and because the images representing any category can be different each time, human-level cognition is needed to enter a series of one or more access codes through the authentication system. Since the access codes corresponding to the images are preferably different with each login or authentication process, even if the user is being keystroke logged, the keystrokes observed are useless on future login or authentication attempts. Moreover, the basis for selection by the user of the access codes and corresponding images is relatively difficult to identify. It may not be readily apparent to an ordinary observer (or fraudster) as to what is the reference point to the user or why a user selects certain images over others. Without explicitly revealing the authenticating category (shared secret), the user is therefore able to complete an authentication process with added security.

Other embodiments of the invention provide dynamic graphical password authentication solutions which include some of the features described in the aforementioned processes and systems. These authentication systems and methods can provide stronger user authentication to reduce the risk of unauthorized access to or use with online accounts, Web sites or resources available on the Internet or enterprise network systems. The graphical passwords provided in accordance with this aspect of the invention include images or icons corresponding to one of any number of selected categories which forms the basis of authentication.

Figure 6:
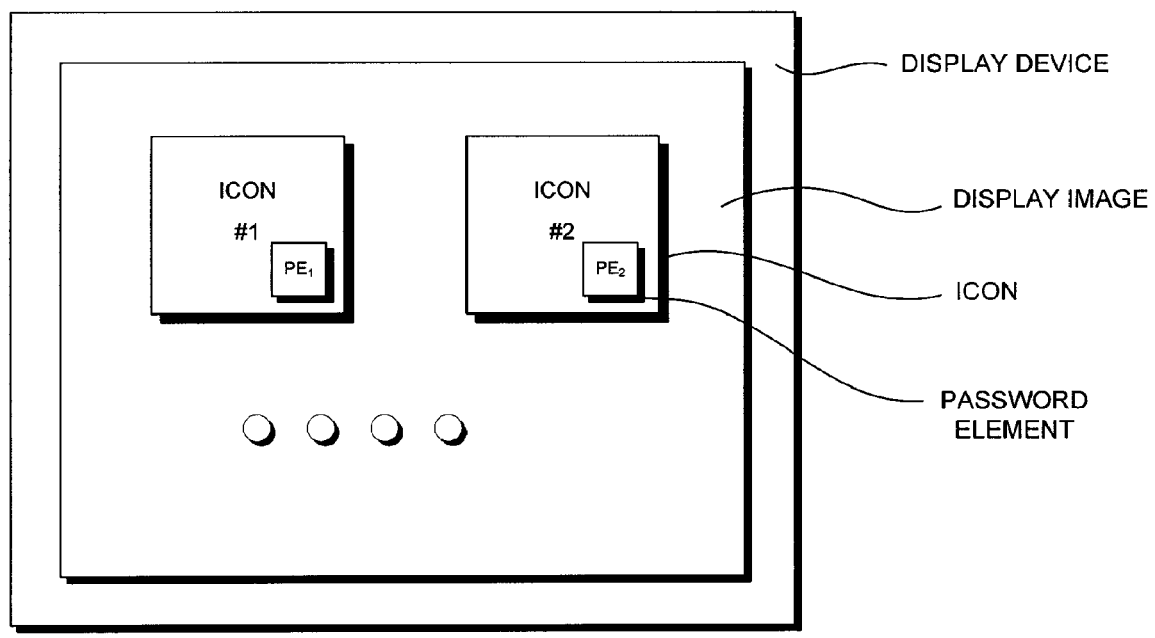
FIG. 6 illustrates a display device for rendering an arrangement of icons.

As shown in FIG. 6, for example, one or more graphical images such as icons can be displayed to a user on a display device according to a predetermined arrangement or pattern. For each displayed icon (Icon #1, #2 . . . ) within a display image, there may be a corresponding access code or password element (PE1, PE2 . . . ) shown to the user. The series of one or more password elements can be therefore entered by the user as a password for that particular authentication process. However, the same password or combination of password elements does not work for a subsequent authentication process in accordance with a preferable embodiment of the invention. Rather the selection of displayed icons themselves, their arrangement or location within a pattern, and their corresponding password elements are preferably different each time in order to create dynamic one-time graphical passwords. It shall be understood that as with other embodiments of the invention herein, each or all of these properties are not required to be dynamic and may be static (the same) instead during or in between authentication processes.

The series of one or more graphical images and corresponding password elements that make-up dynamic passwords are preferably changed between each authentication processes. But the authenticating category of images remains the same or unchanged for the user until an authorized change is made. The authenticating and non-authenticating categories of graphical images are not limited to particular objects only but can include any variety of themes or topics. This allows a wide variety of easy-to-remember categories which avoids requiring a user to memorize conventional character-based character strings or having to enter characters generated periodically by separate hard tokens (e.g., RSA SecureID tokens) since the password elements are displayed concurrently with intuitive corresponding graphical images. The graphical images or icons with respect to FIG. 6 are displayed to a user and may serve indirectly as constantly-changing yet identifiable reference points to password elements. It shall be further understood that the one or more graphical images may be organized in a selected arrangement such as a series of rows and columns (matrix), arrays or any other pattern within a display image.

For example, the display device illustrated in FIG. 6 may receive information to render a display image with two icons and two corresponding password elements. Icon #1 may be an image of a Rolls Royce, while Icon #2 may be an image of a banana. In addition, Icon #1 may include and display a corresponding PE1 that is "AB" and Icon #2 may include and display a corresponding PE2 that is "CD." During an enrollment process such as those described elsewhere herein, a user that selected automobiles as an authenticating category would enter in password element "AB" for authentication. Meanwhile a user that may have selected fruits as an authenticating category would enter "CD" for authentication. An authentication server system (not shown) connected to the display device can compare the selected password elements against a reference password generated for that authentication process. As described elsewhere herein, the reference passwords may be generated by a variety of random number or character generator programs. Accordingly, a perpetrator or even an authorized user would not know what password elements to enter prior to viewing the display image, but only the user would preferably know the authenticating category and look for intuitive graphical icons corresponding thereto while ignoring those from non-authenticating categories. Preferable embodiments of the invention would render each time different types of icons to the user within a particular authenticating category and/or different password elements (alphanumeric characters, symbols). During a subsequent session or another authentication process, the authentication systems and methods herein can generate another series of icons in a different random pattern on the display device, preferably with a different display image background, and preferably with different icons corresponding to both authenticating and non-authenticating categories.

Figure 7:
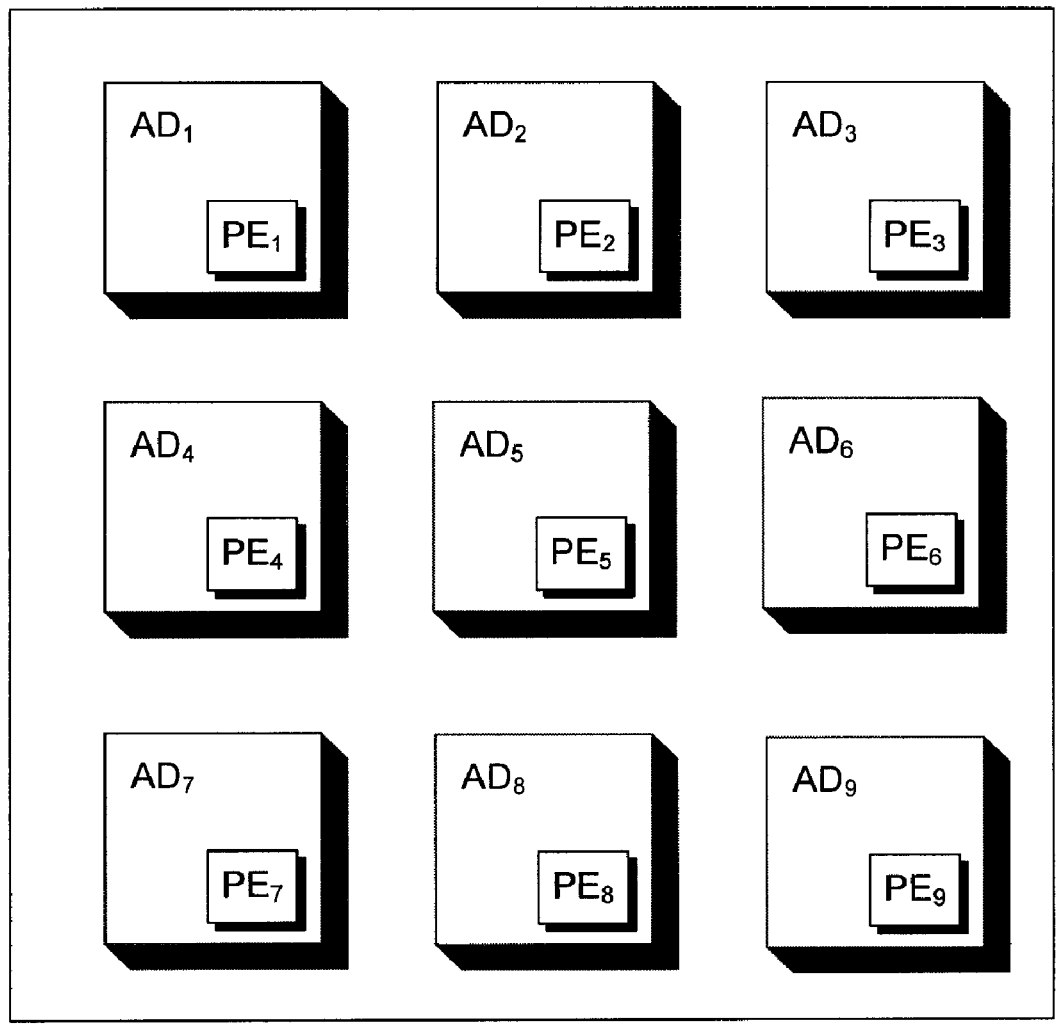
FIG. 7 shows a dynamic graphical password grid that includes various graphical images corresponding to advertisement campaigns.

Another embodiment of the invention may capitalize on the focus and attention of users during an authentication process for advertising and marketing purposes. For example, as shown in FIG. 7, a dynamic graphical image grid can be displayed having a plurality of advertisements or messages paid by sponsors or advertisers. As part of an advertisement (ad) campaigns for a company, one or more advertisements can be introduced into the authentication systems and methods herein. Such advertisements or sponsored messages can serve the dual-purpose of authentication and generating advertising revenue. The advertisements or messages themselves can function as the graphical images viewed by users which fall into authenticating and non-authenticating categories. While user attention may be greater for advertisements relating to an authenticating category for the user, advertisements relating to non-authenticating users are also valuable as they too are displayed.

A dynamic image grid as shown in FIG. 7 may include a selected arrangement of advertisements (ads) that may be rendered during each authentication process for different users. The arrangement may include any number of ads displayed for viewing, but a preferable embodiment of the invention is shown having nine (9) ads arranged in a 3×3 grid (AD1-9) each having a corresponding password element (PE1-9). Because of the wide range of both authenticating and non-authenticating categories that is available for carrying out the invention, each category presents advertising opportunities within many different channels. For example, a category may be selected such as automobiles. AD1 and AD9 may thus include ads for cars sold by Car Manufacturer #1 (e.g., Ford). AD2 and AD8 may include ads for bottles of wine sold by Wine Maker #1 (e.g., Gallo), and AD3 and AD7 may be ads for cosmetics sold by Cosmetics Company #1 (e.g., Avon) etc. Upon presentation of the dynamic image grid, a user who selected or was assigned an authenticating category of automobiles would type or enter within a PASSWORD field the characters displayed for PE1 and PE9. When an authenticating category is wine, the user would select PE2 and PE8. When cosmetics are chosen the authenticating category, the user would select PE3 and PE7. While some of the preceding examples describe the use of passwords composed of two or three password elements, it shall be understood that any number of one or more password elements may be used for authentication.

Furthermore, ads may cross numerous markets such as consumer products when a user selects a theme such as "red" or "things that are red." For example, the authentication password would be the combination of PE1+PE2+PE3 when AD1 is a red Mustang, AD2 is a bottle of cabernet sauvignon, AD3 is a tube of lipstick. In addition to ads, this aspect of the invention can be applied to other embodiments of the invention described herein which provide arrangements of dynamic graphical images or icons. Rather than categorizing an object to be displayed based on what it is—the thing itself alternative embodiments of the invention may include categories of graphical or visual images, icons or ads that are based on some common attribute, feature, theme or characteristic of the displayed object —something about the thing. For example, a user may select an authenticating category based on a certain "attribute" about the (displayed images) such as "things featuring water" (a beach, a pool, rain, bottled water), "things that are round" (a golf ball, a hot air balloon, a tire), "things that are blue" (a clear sky, a blue tropical fish, a blue shirt, a recycling bin for glass/plastic), and "things made of wood" (a baseball bat, a log cabin, a tree, a forest). Accordingly, advertisers may be provided the opportunity to present a diverse range of product ads that can be grouped into one or more selected categories according to some commonality that also serves as a shared secret between a user and a third party for purposes of authentication.

It shall be understood that ads or graphical images herein may fall within one or more categories available as a way to authenticate a person. Ads or graphical images can be also displayed more often within regularly scheduled display cycles even if they are within non-authenticating categories. The ads or graphical images that are selected for display within an arrangement or grid may nevertheless capture the attention of users even if they do not necessarily fall within an authenticating category since graphical images or ads for non-authenticating categories are also displayed.

As with other embodiments of the invention, the sequence in which the password elements (image identifiers) are entered may be of consequence or not depending upon the desired level of authentication. When their order or sequence matters (e.g., PE1+PE9), then typically stronger authentication is offered when compared to authentication where order does not matter and can be completed with any sequence of one or more password elements (e.g., PE1+PE9 or PE9+PE1). In preferable embodiments of the invention where specific sequences of entering the passwords are required, then either an intuitive or explicit order of entry can be provided to the user. For example, when presented by a 3×3 grid such instruction may not be required as the user may be reminded of a telephonic keypad with consecutive numbers 1-9. The order of entry may be therefore entering characters within password elements from top to bottom of the display, and from left to right.

Figure 10A:
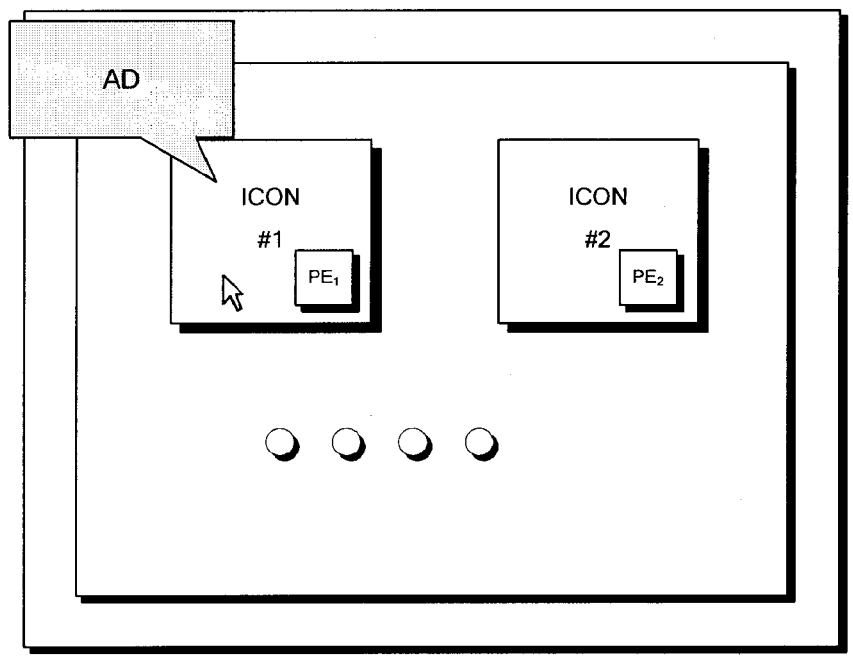
FIG. 10A shows a display device for rendering an arrangement of icons with a popup element.

Another embodiment of the invention may also capitalize on the focus and attention of users during an authentication process for advertising and marketing purposes. As shown in FIG. 10A, one or more graphical images, such as icons, may be displayed to a user on a display device according to a predetermined arrangement or pattern. For each displayed icon within a display image, there may be a corresponding access code or password element shown to the user, as discussed previously in FIG. 6. When a user moves a pointing device indicator over an icon (such as Icon #1), one or more popup element may appear (AD).

A user may interact with a display device using a number of input-output devices, such as a mouse, trackball, keyboard, touchpad, or any other pointing device. By interacting with an input-output device, such as a mouse, a user may control a pointing device indicator on the display device. For example, common pointing device indicators may include an arrow-like mouse cursor, or pointers of various shapes, such as hands, cross-bars, hourglasses, brushes, or pencils. A pointing device indicator can take any number of visual forms.

The popup element may remain as long as the user's pointing device indicator is over the icon. The popup may disappear as soon as the user moves the user's mouse so that the indicator is off the icon. Alternatively, the popup may disappear after a brief delay (i.e. several seconds) from when the user moves the user's indicator off the icon. In one embodiment the popup may remain even if a user removes the user's indicator from the icon, if the user moves the user's indicator onto the popup element within a given time period.

A popup element may display an advertisement. The advertisement may be related to the graphical image of the icon. For example, if the icon were to include an image of a car, a popup element may include a car-related advertisement, such as a car dealership or gas station. The popup may include a link that can direct the user to a website, such as the advertiser's website. The popup element may provide a form of targeted advertisement.

A popup element may also display any content that may be relevant to the content of the graphical image. For instance, if the graphical image is an advertisement, the popup element could include a displayed contact for the advertiser, such as a phone number. The popup element could also include a message to the user. The popup element may also include a link that a user could click on. The link may direct a user to a website of an advertiser related to the graphical image that the user's indicator is over. Or the link may direct a user to a relevant website pertaining to the graphical image, or to a chat or forum.

Figure 10B:
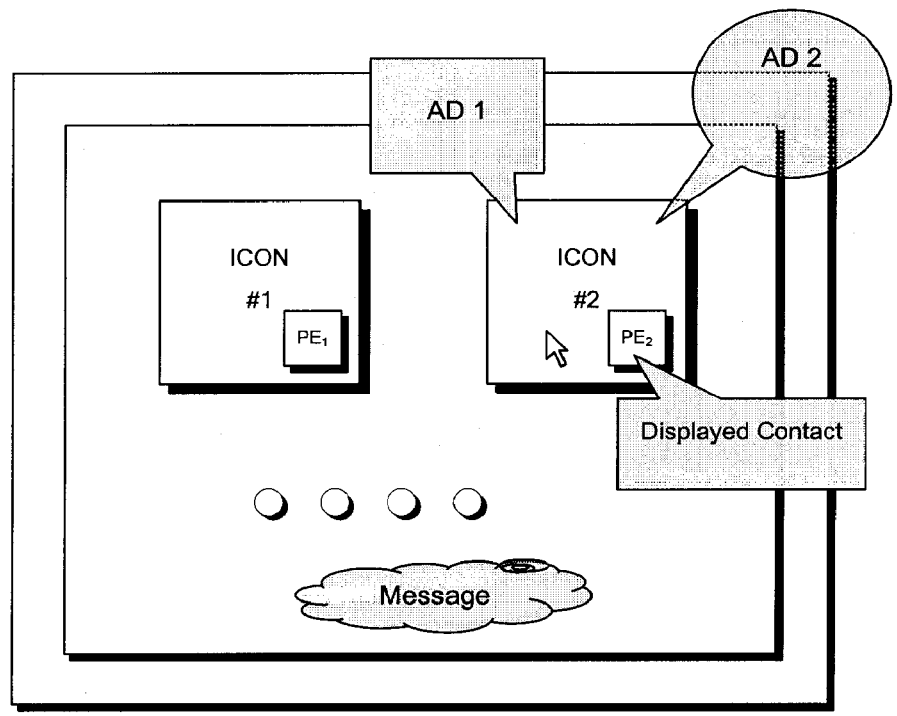
FIG. 10B shows a display device for rendering an arrangement of icons with multiple popup elements.

As shown in FIG. 10B, more than one popup element may appear (AD1, AD2, Displayed Contact, Message) when a user moves the user's pointing device indicator over an icon (such as Icon #2). The popup elements may have different forms. For example, the popup element may appear as a bubble of any given shape which may show up anywhere on a display image. The popup element and may or may not be connected or in close proximity to the icon that the user's indicator is over. For instance, there may be a designated popup area on the screen, such as a corner, where the popup elements may be displayed. The popup element may also be opaque and cover the display image, or may be transparent and allow some of the display image beneath to remain visible.

The multiple popup elements may display advertisements. The advertisements may be related to the graphical image of the icon. For example, if the icon were to include an image of a car, the popup elements may include multiple car-related advertisements, such as an advertisement for a car brand, an advertisement for a car dealership, an advertisement for a gas station, or an advertisement for car insurance. Having multiple popup elements may provide a form of targeted advertisement on one or more aspects of the graphical image. The popup elements may also display any content that may be relevant to the content of the graphical image, as discussed previously.

Figure 11:
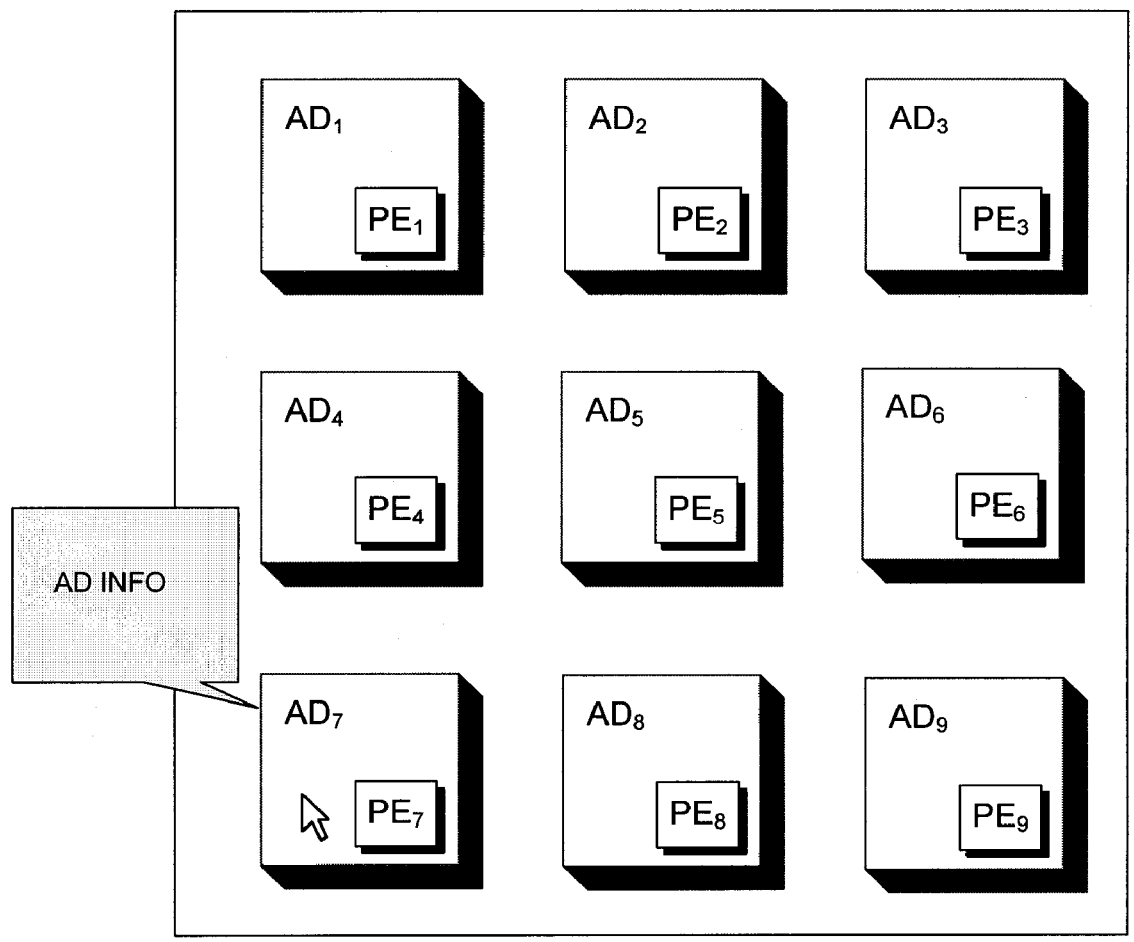
FIG. 11 shows a dynamic graphical password grid that includes various graphical images corresponding to advertisement campaigns, along with a popup element.

FIG. 11 shows a dynamic graphical image grid, which may be displayed having a plurality of advertisements or messages paid by sponsors or advertisers, as discussed previously in FIG. 7. When a user moves the user's pointing device indicator over an advertisement (such as AD7), one or more popup element may appear (AD INFO). The popup element may include more detailed information regarding the advertisement content. For example, if a user were to move the user's pointing device indicator over an advertisement showing an image of a Ford Mustang, the popup element may show information about a nearby dealership that sells Ford cars. The popup element may also show information, such as a map showing all of the nearby Ford dealerships. The popup element may also show information relating to the general category of advertisements. For example, if the advertisement showed the image of a Ford Mustang, the popup element may show car-related information, such as a map of nearby gas stations.

The popup element may also include a link that a user could click on. The link may direct a user to a website of the advertiser for the advertisement that the user's pointing device indicator is over. Or the link may direct a user to a relevant website. For example, if the advertisement showed the image of a Ford Mustang and the popup element showed a map with all of the nearby gas stations, the map may include a link at a location that the user could click on to get information about the gas station. Or the link may direct a user to any other type of relevant website such as a chat or forum.

Figure 8:
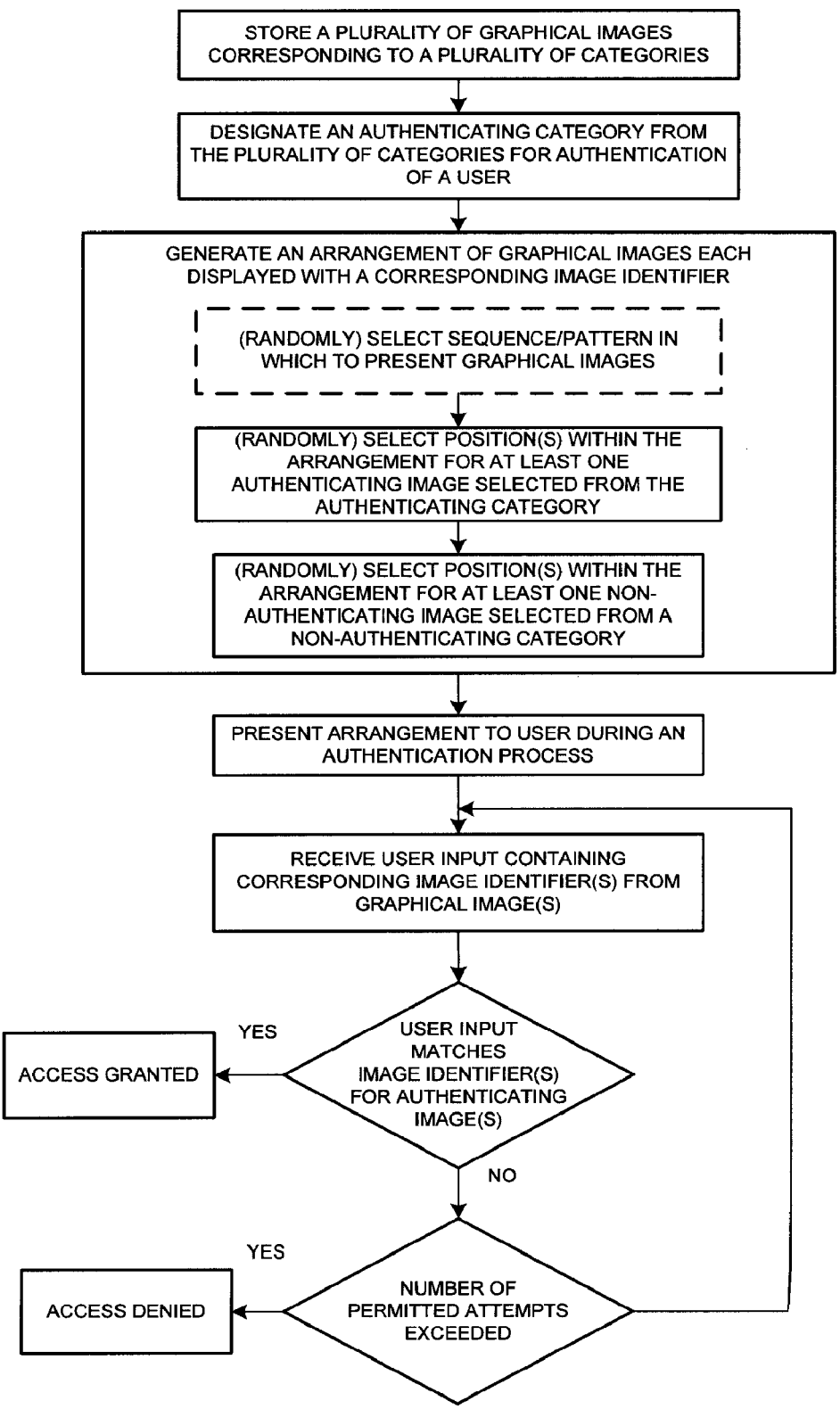
FIG. 8 is a flowchart describing methods of authenticating users in accordance with the invention.

FIG. 8 is a flow diagram describing another aspect of the invention that provides various methods of authentication using dynamic graphical images. A plurality of graphical images may be stored within a database or a computer memory that correspond to one or more available categories. From the numerous available categories, a user may designate an authenticating category from the plurality of categories during an enrollment process. During an authentication process, a dynamic graphical image arrangement may be generated by a server system containing at least one graphical image, and at least one corresponding image identifier or password element. For example, a random password generator may construct a reference password to be used for an authentication process, such as "4847." Each character or digit within the password may be assigned as the image identifier (or part thereof) to preselected images falling with the authenticating category. A series of other graphical images from non-authenticating categories may be also assigned non-authenticating image identifiers to fill-out the arrangement. The server system may be instructed to randomly select (or not) the pattern in which to present the graphical images to the user. The graphical images falling within the authenticating category may be randomly (or not) positioned within the arrangement, and their corresponding image identifiers are displayed too. Furthermore, the graphical images from non-authenticating categories can be randomly (or not) positioned within remaining portions of the arrangement. For example, four (4) graphical images of one or more cars can be displayed as part of an authenticating category of automobiles, each having a corresponding image identifier "4," "8", "4", and "7." In an embodiment of the invention where a 4×4 image grid is provided (16 graphical images total), twelve (12) graphical images from non-authenticating categories are displayed to fill-out the arrangement which preferably have nothing to do with automobiles. The image identifier information and associated data for the generated arrangement is then stored by the server system in a memory. The arrangement or layout of the graphical images, the images themselves, and the characters of the displayed image identifiers, are preferably different between authentication processes. Alternatively, any or all of these properties may remain the same (static) in between authentication processes. The authenticating category can remain the same until an authorized change is made which can be accomplished in a manner similar to the enrollment process described above.

During an authentication process, the arrangement of dynamic graphical images can be delivered and presented to a user on a display device or display within the client system. The user may input the one or more image identifiers (e.g., 4-8-4-7) corresponding to the graphical images falling within the designated authenticating category. The client system receives the input from the user, and transmits it to the server system, which compares the image identifier information to the stored reference password (e.g., 4847). When the user input matches the reference password stored in the server system, authentication can be completed and access granted to the requested resource, online account or any other secured information. When image identifier information or a password does not match the references password, then access is denied. As with other embodiments of the invention, a user may be also permitted a predetermined number of attempts before account lock-out or any other administrative action is instituted such as the implementation of network security measures indicating the possibility of hacking or attacks.

Figure 9:
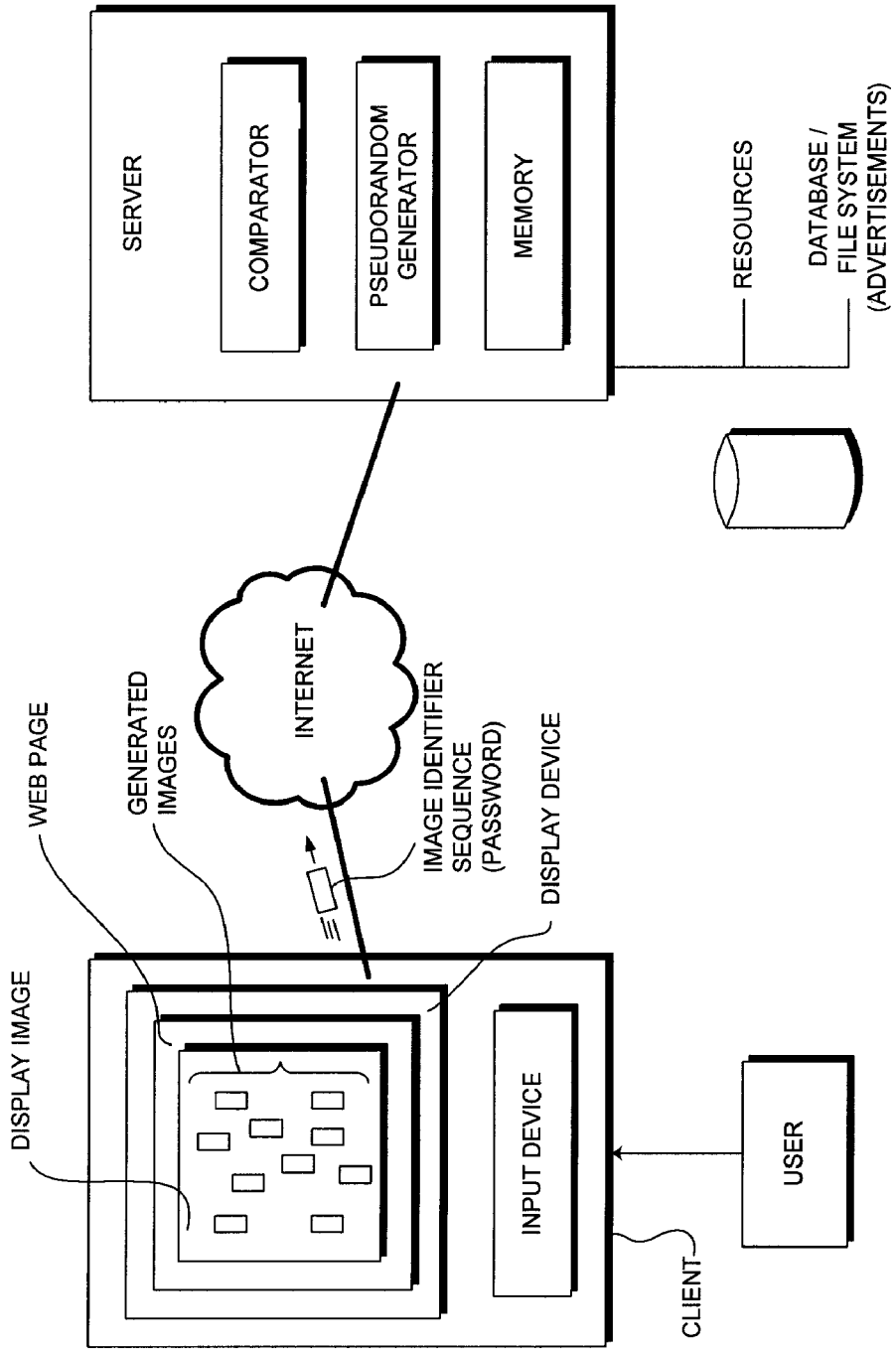
FIG. 9 is an illustration of client/server architecture for user authentication over the Internet.

FIG. 9 illustrates an authentication system provided in accordance with another embodiment of the invention. A server system may include or be configured as an authentication server that generates an arrangement of pseudo-randomly positioned images or icons each associated with a password element. The arrangement may include one or more authenticating images, which form at least part of an authenticating sequence, plus one or more non-authenticating images or icons that do not form at least part of the authenticating sequence. Thereafter the arrangement can be sent to the client system for display on a display device. The user may select or input the image identifiers or password element(s) corresponding to the images or icons selected within the arrangement. Selected password elements can then be communicated by the client system to the server system. The server system can compare the user selected password elements relative to a reference password, and further analyze related information with any other associated authentication data that may be stored in a memory within the server system. The authentication system may be configured to accept either a sequential or non-sequential entry of password elements in order to properly authenticate a user. Upon the correct entry of the one or more password elements, which matches the reference password, authentication of the user can be completed.

As with some of the other embodiments of the invention herein, the term "password" can be described as a form of secret authentication data that is used to control access to a resource. It need not be an actual word and can be a series of one or more alphanumeric characters or symbols, for example. In controlling access to resources, there are often trade-offs between security and convenience. The accessibility of password-protected systems can depend on a variety of parameters taking into consideration the level of security desired. While earlier forms of passwords may have been limited in the possible number of characters or numbers (e.g., max. four or five numbers only), there are very few limitations to available passwords today which could also be incorporated into the methods and systems provided herein (e.g., combination of numbers and upper/lower case letters with character lengths of 6, 7, 8, 9 or more, symbols, punctuation, and device inputs). Moreover, selected password strengths may be chosen for different applications in accordance with the invention. For applications that may not require stronger security, a relatively weak password can be adopted for the sake of convenience that prompts users for entry of only a few characters or password elements. For applications that may require stronger security, a relatively strong password can be adopted that includes a longer string and/or combination of characters to better withstand a brute force attack based on subsets of words from a dictionary or similar source. Furthermore, a pseudo-random or random password generator may be incorporated with the invention that can be provided as a software program and/or hardware device. In some instances, an input is received from a random or pseudo-random number generator which in turn creates a password. A variety of known random password generators may be selected for the authentication systems and methods herein that can generate a string of characters etc. of any desired length. It shall be understood that selected passwords and password generation programs can be customized or modified to comply with established or desired password policies setting forth the kinds of password elements that can be used or combinations thereof to produce a mix of letters, numbers, symbols, characters etc.

The authentication systems provided herein may include a client system with which a user interacts, and a server system to which the user wants to gain access.

The server (system) may control access to a resource, a database or file system, or a private communication channel. The server may also include a computer readable memory, a comparator and a communications interface such as a modem or network adapter with appropriate software drivers that support communication with the client system over a communications system. The server system may further include a secured network, file systems or resources and information stored in databases as described elsewhere herein. The databases may contain one or more libraries of graphical images or icons that can be displayed for authentication and other purposes (e.g., advertising). The server system may also include numerous devices such as file servers (Web site servers), authentication servers, password databases, repositories or databases of graphical images or icons that may be identified as part of authenticating and non-authenticating categories.

A memory device in the server system may store information regarding the relationship between the graphical images and image identifiers displayed to a user during authentication. A memory look-up table can be used to store this information for mapping this information. The memory may be implemented using random access memory ("RAM"), flash memory, disk drives or any other rewritable memory technology. In some applications, the memory may also be implemented using non-rewritable memory such as read only memory ("ROM") chips.

The client system may include various devices such as a desktop or laptop computer, a PDA, an ATM, or any device capable of displaying graphical images having a key entry pad or keyboard for entering data. A client system device preferably includes an input device, a display device and an appropriate communications interface which allows data from the input device to be transmitted to the server system. The communications interface might include a modem, network adapter, radio transmitter/receiver, or other such communications devices, along with appropriate software. The display device may be any type of display capable of displaying various graphical images or icons, such as computer monitors and flat panel displays. The input device may a computer keyboard or a keypad, or other such entry system that allows image identifiers or password elements to be entered.

Furthermore, the client and server systems can communicate over a variety of telecommunication systems including wireless networks. The telecommunications system may also include a variety of data communications systems generally known in the art such as a LAN, a WAN, a wireless system such as cellular, satellite and personal communications services ("PCS") systems, or a dedicated line or connection. In this regard, it is noted that the references to server side and client side herein do not require a direct communication therebetween and intermediate computers may be present. Moreover, a computer acting as a server could transmit information to an intermediate computer which could then transmit the information to another computer where the user enters data. The terms "client" and "server" as used herein are general and are not limited to so-called "client/server" systems. It shall be further understood that references to a server and a client also may apply to a peer-to-peer system or architecture with any two communicating computers, where at least one such computer controls or possesses a resource, and another computer is used to access the resource.

As shown in FIG. 9, a user may select a device (client) on which to access a secured resource or information stored on a server system. The user may be identified by the server system with an account number, name or other user identification information. When the server system determines the user is a recognized user, it can generate a display image including an arrangement of dynamic graphical images or icons arranged for presentation on the display device.

As with other embodiments of the invention, the server may generate the display image by selecting, pseudo-randomly in a preferable embodiment, graphical images based on prior user selection or otherwise of an authenticating category. Alternatively, display image may be pre-generated or displayed according to a pre-established routine or computer program, and stored in a database system. The display image and graphical display images or icons may be implemented as a bit mapped image, a raster image or in any other suitable image file format.

The display image may also include image identifiers corresponding to each of the graphical images or icons displayed. The user may input an image identifier sequence corresponding to graphical images within an authenticating category. In a preferable embodiment of the invention, the arrangement of the images is pseudo-randomly varied with each server access request. In addition, the particular images/scheme and image identifiers presented in the display image may be varied with each authentication process.

In order to enter user password information or other authentication data in accordance with this embodiment of the invention, the appropriate image identifiers for authenticating images within the display image are identified by the user. The user enters on the input device the image identifiers by the user and communicated to the server system. For some preferable embodiments of the invention, the sequence in which the password information is entered is important in which case the user understands or is advised of the order of entry (left to right, right to left, top to bottom, bottom to top). The server system utilizes a comparator to compare the selected image identifiers with reference password information as described elsewhere herein. The comparator in the server system can compare the one or more image identifiers entered by the user to reference password information to determine whether they correspond to each other and match. If so, the user will be allowed appropriate access to the server system. It shall be understood that the comparator, and other components to the aforementioned client/server systems implemented in any of the authentication systems and methods herein, may incorporate software using techniques known in the prior art.

Many embodiments of the invention can provide dynamic image authentication arrangements that can be incorporated into existing authentication systems for preventing unauthorized access. Because cyber crimes often begin with unauthorized users gaining access to accounts to online accounts and applications, concepts of the invention herein can be implemented to create a first line of defense that provides stronger user authentication. Various embodiments of the invention provide secure login routines for user authentication that are effective against many prevalent forms of hacking, including historic threats like phishing, as well as new and growing threats like brute-force attacks, keystroke logging, and man-in-the-middle (MITM) spying. Additional embodiments of the invention can be modified for a variety of applications including network login, virtual private network (VPN) access, and web-based applications and websites.

It should be understood from the foregoing that, while particular implementations have been illustrated and described, various modifications can be made thereto and are contemplated herein. It is also not intended that the invention be limited by the specific examples provided within the specification. While the invention has been described with reference to the aforementioned specification, the descriptions and illustrations of the preferable embodiments herein are not meant to be construed in a limiting sense. These are described as examples in relation to the drawings attached hereto and further modifications, apart from those shown or suggested herein, may be made within the spirit and scope of the invention. Furthermore, it shall be understood that all aspects of the invention are not limited to the specific configurations set forth herein which depend upon a variety of conditions and variables. Various modifications in form and detail of the embodiments of the invention will be apparent to a person skilled in the art. It is therefore contemplated that the invention shall also cover any such modifications, variations and equivalents.

What is claimed is:

1. A method for authenticating a user comprising the following steps of:
   generating a one-time password by generating an authenticating reference code that is displayed in a dynamic graphical arrangement of at least two images wherein each image has a corresponding access code that is displayed to the user,
   wherein the dynamic graphical arrangement of images comprises:
      at least one image selected from an authenticating category of graphical images, wherein the authenticating category of graphical images is preselected by the user from a plurality of different image categories and the specific image for each category is chosen randomly from a plurality of images for the specific category, and
      at least one image selected from a non-authenticating category of graphical images;
   presenting the dynamic graphical arrangement of images to a user;
   receiving as input from the user one or more access codes corresponding to images from the authenticating category of graphical images; and
   comparing the one or more access codes received from the user to the authenticating reference code to authenticate the user.

2. The method for authenticating a user as recited in claim 1 further comprising:
   denying access to the user if the input is determined not to match the authentication reference code.

3. The method for authenticating a user as recited in claim 1, wherein the dynamic graphical arrangement is presented on a display corresponding to a computer device that provides user access to confidential information.

4. The method for authenticating a user as recited in claim 1, wherein the dynamic graphical arrangement of graphical images comprises images that are presented to the user for a purpose in addition to authenticating the user.

5. The method for authenticating a user as recited in claim 4, wherein the purpose in addition to authenticating the user is advertising.

6. The method for authenticating a user as recited in claim 1, wherein the dynamic graphical arrangement of images is presented to the user on a mobile device display.

7. The method for authenticating a user as recited in claim 1, wherein the images selected from an authenticating category of graphical images are randomly arranged within the dynamic graphical arrangement of images.

8. The method for authenticating a user as recited in claim 1, wherein the access codes for the images selected from the authenticating category are randomly selected.

9. The method for authenticating a user as recited in claim 1, wherein the images from the authenticating category are randomly selected from a database of images for that specific category.

10. The method for authenticating a user as recited in claim 1, wherein the one or more access codes are randomly selected and not known to the user beforehand.

11. The method for authenticating a user as recited in claim 1, wherein the dynamic graphical arrangement of images comprises two or more different authenticating categories of graphical images preselected by the user.

12. A method for authenticating a user comprising the following steps:
generating a one-time password that is associated with a dynamic graphical arrangement of at least two images wherein each image has a corresponding access code, wherein the dynamic graphical arrangement of images comprises:
at least one image selected from an authenticating category of graphical images, wherein the authenticating category of graphical images is preselected by the user from a plurality of different image categories and the specific image for each category is chosen randomly from a plurality of images for the specific category, and at least one image selected from a non-authenticating category of graphical images;
presenting the dynamic graphical arrangement of images for display on a device display;
receiving a password entry from a user comprising one or more access codes corresponding to the authenticating category images in the dynamic graphical arrangement of images; and
authenticating the user when the password entry matches the one-time password.

13. The method for authenticating a user as recited in claim 12, wherein the graphical images relate to sponsored messages or advertisements.

14. The method for authenticating a user as recited in claim 12, wherein the password elements are formed of one or more alphanumeric characters or symbols.

15. The method for authenticating a user as recited in claim 12, wherein the user is authenticated only when the password elements are entered by the user in a specific sequence.

16. The method for authenticating a user as recited in claim 12, wherein the user is authenticated regardless of the order in which the password elements are entered by the user.

17. The method for authenticating a user as recited in claim 12, wherein the device display is for a Web enabled computer or mobile device.

18. The method for authenticating a user as recited in claim 12, wherein a specific image is static and presented again during a subsequent authentication process.

19. A computer system having a computer readable medium, wherein the medium is not a signal, that stores a computer program with machine readable instructions for carrying out the method for authenticating a user as recited in claim 12.

20. A graphical interface for user authentication and advertising comprising:
a dynamic graphical image grid that includes an authenticating reference code and each image on the dynamic graphic image grid has a corresponding access code that is displayed to the user,
wherein the dynamic image grid comprises a plurality of advertisements, wherein the plurality of advertisements comprises at least one image selected from an authenticating category of graphical images, wherein the authenticating category of graphical images is preselected by the user from a plurality of different image categories and the specific image for each category is chosen randomly from a plurality of images for the specific category, and at least one image selected from a non-authenticating category of graphical images,
receiving as input from the user one or more access codes corresponding to images from the authenticating category of graphic images;
comparing the one or more access codes received from the user to the authenticating reference code to authenticate the user;
and
a popup element displayed while a pointing device indicator is over at least one of the advertisements.

21. The graphical interface as recited in claim 20, wherein the dynamic graphical image grid is configured as a three by three grid.

22. The graphical interface as recited in claim 20, wherein the authenticating category of graphical images is selected by a user during an enrollment process.

23. The graphical interface as recited in claim 20, wherein the plurality of advertisements are randomly arranged within the dynamic graphical image grid.

24. The graphical interface as recited in claim 20, wherein the plurality of advertisements are different during each rendering of the dynamic graphical image grid, and wherein password elements for each graphical image are different during each rendering of the dynamic graphical image grid.

25. The graphical interface as recited in claim 20, wherein the positioning of the plurality of advertisements within the dynamic graphical image grid are different during each rendering of the dynamic graphical image grid.

\* \* \* \* \*